(12) United States Patent
Valkov et al.

(10) Patent No.: US 9,274,783 B2
(45) Date of Patent: Mar. 1, 2016

(54) DYNAMIC DELIVERY AND INTEGRATION OF STATIC CONTENT INTO CLOUD

(71) Applicants: Krum Valkov, Sofia (BG); Georgi D. Dimitrov, Sofia (BG); Stoyan Boshev, Sofia (BG); Nikolai Neichev, Sofia (BG)

(72) Inventors: Krum Valkov, Sofia (BG); Georgi D. Dimitrov, Sofia (BG); Stoyan Boshev, Sofia (BG); Nikolai Neichev, Sofia (BG)

(73) Assignee: SAP SE, Walldorf (DE)

(*) Notice: Subject to any disclaimer, the term of this patent is extended or adjusted under 35 U.S.C. 154(b) by 57 days.

(21) Appl. No.: 14/140,493

(22) Filed: Dec. 25, 2013

(65) Prior Publication Data

US 2015/0178065 A1 Jun. 25, 2015

(51) Int. Cl.
*G06F 9/44* (2006.01)
*G06F 9/445* (2006.01)
*G06F 17/30* (2006.01)

(52) U.S. Cl.
CPC .............. *G06F 8/65* (2013.01); *G06F 9/4446* (2013.01); *G06F 17/30011* (2013.01); *G06F 17/30073* (2013.01)

(58) Field of Classification Search
None
See application file for complete search history.

(56) References Cited

U.S. PATENT DOCUMENTS

| | | | |
|---|---|---|---|
| 7,562,341 B2 | 7/2009 | Kovachka-Dimitrova et al. | |
| 7,711,607 B2 | 5/2010 | Agassi et al. | |
| 7,865,829 B1 | 1/2011 | Goldfield et al. | |
| 8,069,413 B2 | 11/2011 | Methot | |
| 8,112,747 B2 | 2/2012 | Haeberle et al. | |
| 8,386,932 B2 | 2/2013 | Shewchuk | |
| 8,417,737 B2 | 4/2013 | Hopmann et al. | |
| 8,538,947 B2 | 9/2013 | Matejka et al. | |
| 8,589,909 B2 | 11/2013 | Hu et al. | |
| 2003/0051227 A1* | 3/2003 | Burch et al. | 717/109 |
| 2006/0117315 A1 | 6/2006 | Bussert et al. | |
| 2007/0179841 A1 | 8/2007 | Agassi et al. | |
| 2007/0185976 A1 | 8/2007 | Solis | |
| 2008/0005111 A1* | 1/2008 | Savage | 707/8 |
| 2010/0095197 A1 | 4/2010 | Klevenz et al. | |
| 2011/0083167 A1* | 4/2011 | Carpenter et al. | 726/4 |
| 2011/0307780 A1 | 12/2011 | Harris et al. | |
| 2012/0131101 A1 | 5/2012 | Said et al. | |
| 2012/0173481 A1 | 7/2012 | Poth et al. | |
| 2013/0170814 A1* | 7/2013 | Kuchinomachi et al. | 386/224 |
| 2013/0198605 A1* | 8/2013 | Nicola et al. | 715/234 |
| 2013/0238552 A1* | 9/2013 | Saib | 707/609 |
| 2014/0304235 A1* | 10/2014 | Rooks et al. | 707/667 |
| 2014/0324439 A1* | 10/2014 | Feng et al. | 704/270 |

* cited by examiner

*Primary Examiner* — Philip Wang

(57) ABSTRACT

A documentation application periodically checks content of a documentation repository to determine whether the documentation repository includes documentation content for update. A documentation archive for update is retrieved from the documentation repository and parsed to read meta information specified in the documentation archive. Based on the meta information, content of the documentation archive for update is integrated into the documentation application at runtime of the documentation application.

21 Claims, 8 Drawing Sheets

DYNAMIC DELIVERY AND INTEGRATION OF STATIC CONTENT INTO CLOUD

BACKGROUND

Cloud computing refers to a model for enabling ubiquitous, convenient, and on-demand access to shared pools of configurable computing resources such as networks, servers, storages, applications, functionalities, and the like. There are a number of benefits associated with cloud computing for both providers of the computing resources and their customers. For example, customers may develop and deploy various business applications on a cloud platform, supplied by a cloud provider, without the cost and complexity to procure and manage the hardware and software necessary to execute the applications. The customers do not need to manage or control the underlying cloud platform, e.g., including network, servers, operating systems, storage, etc. However, customers still have control over the deployed applications and their related software documentation. On the other hand, computing resources of the cloud platform are available to provide multiple customers with different physical and virtual resources dynamically assigned and reassigned according to clients' load.

Various customers may deliver ad hoc software documentation for their respective applications, deployed or to be deployed on a cloud platform. A provider of the cloud platform may provision the software documentation at a central location, for example, a web application for documentation. However, each customer may follow different delivery cycle of the applications as well as of the respective software documentation for those applications. Thus, each customer may request ad hoc from the software provider to include or update the software documentation in the documentation application. Further, requests related to the software documentation may be potentially independent from the delivery cycle of the respective applications or out of sync. To include or update software documentation, the provider modifies the content of the documentation application, rebuilds and redeploys the documentation application, causing its downtime. With the increase of customers and desired updates of the software documentation, such approach may be hard to scale, could cause delivery of software documentation that is out of sync with the respective applications, and may often cause downtime of the documentation application.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for dynamic delivery and integration of static content into cloud are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
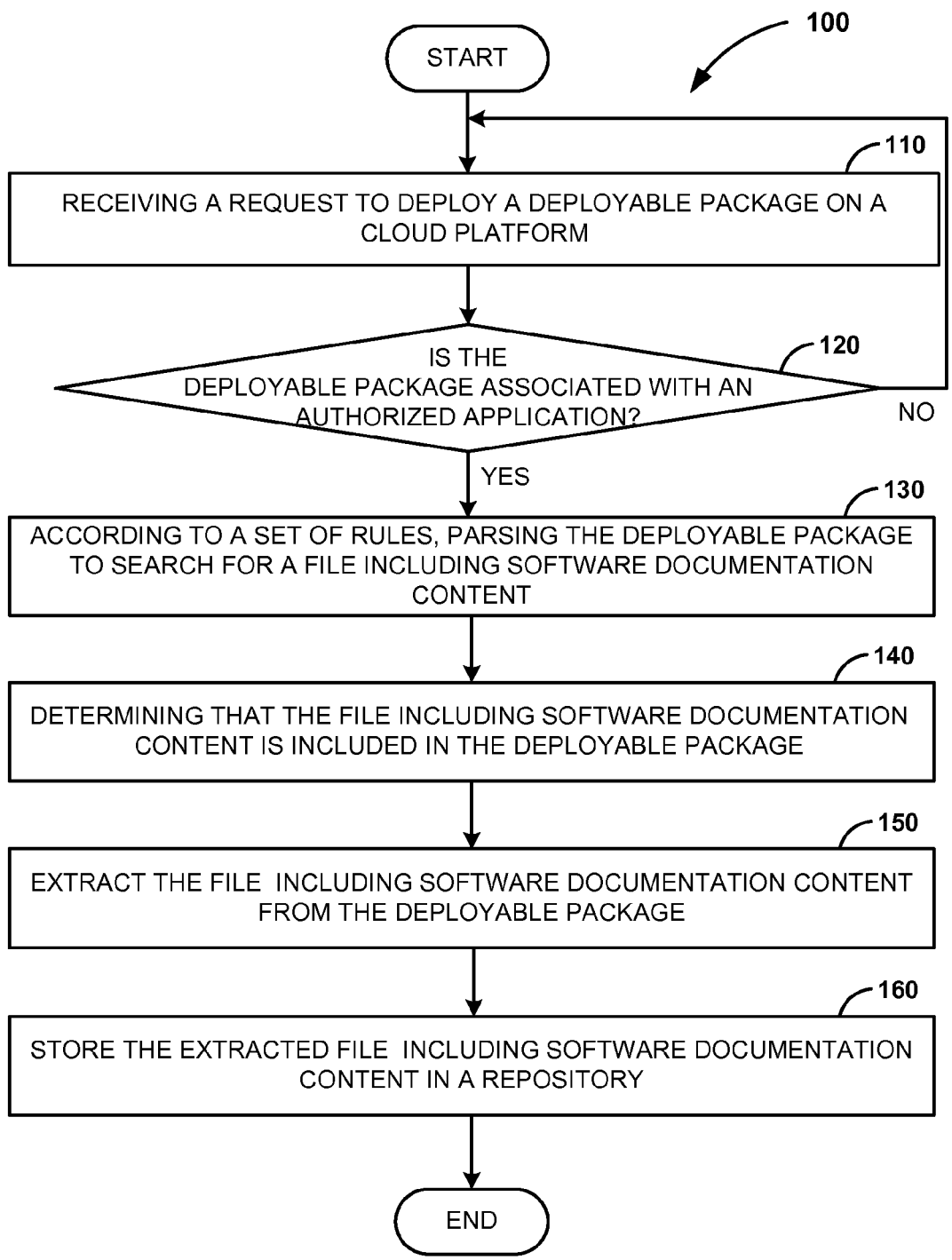
FIG. 1 illustrates a process to dynamically deliver static content to a cloud platform, according some embodiments.

FIG. 1 illustrates process 100 to dynamically deliver static content to a cloud platform, according to some embodiments. At 110, a request to deploy a deployable package on a cloud platform is received. The deployable package may be associated with or be pertinent to one or more specific software applications, modules, components, features, services, or other business logic functionality. Examples of a deployable package include, but are not limited to, Java ARchive (JAR), Web application ARrchive (WAR), Enterprise Archive (EAR), Web Application Bundle (WAB), etc. A deployable package may include compiled source code of the associated software application or module such as binaries. The compiled source code is dynamic content that represents functional logic of the respective application or module. In some embodiments, the deployable package may further include metadata, resources, and software documentation for the associated application or module. The software documentation represents static help content describing functionality and usage guidelines of the respective application or module. The software documentation may include textual description and visual illustration of the associated software application or module.

In various embodiments, a cloud platform is an on-demand runtime platform. A cloud platform may include functionality such as resource pooling, where the computing resources of the cloud infrastructure provider are pooled to serve multiple consumers using a multi-tenant model. Another functionality that the cloud platform may provide is elasticity that refers to the capability of the platform to elastically provision and release computing resources to scale commensurate with demand. The cloud platform may also expose a metering characteristic that refers to the capability of the cloud platform to automatically control, monitor, report, and optimize resource usage at some level of abstraction appropriate to the type of service, for example, storage, processing, bandwidth, and active user accounts, and so on.

A cloud platform can be viewed as containing both a physical layer and an abstraction layer. The physical layer may consist of the hardware resources that are necessary to support the cloud services being provided, and may typically include a server, a storage unit, network components, and so on. The abstraction layer may include the software deployed across the physical layer, which manifests the essential functionalities provided by a cloud platform. For example, the cloud platform may provide an application runtime, user interface (UI) development toolkits, internal configurations, cloud services such as a connectivity service, a persistence service, an identity service, a feedback service, a document service, etc. The functionality provided by the cloud platform can be used by customers of the cloud platform to develop and deploy software applications on the cloud platform. In one embodiment, customers or consumers of the cloud platform may provide one or more deployable packages representing software applications to be deployed on the cloud platform. In some embodiments, the software applications may be developed using functionality of the cloud platform. Compiled source code contained in the deployable packages can be executed onto the cloud platform. In various embodiments, the cloud platform may also provide support for the application lifecycle process, for example, deployment, installation, provisioning and maintenance of applications that may be built, deployed, installed and run on the cloud platform. In one embodiment, the cloud platform may be platform-as-a-service implemented in Java.

In various embodiments, prior to completion of a deployment operation, at 120, it is checked whether the deployable package is associated with an application that is authorized to be deployed on the cloud platform and whether the account requesting deployment is also authorized. This is performed to prevent unauthorized deployment. If the deployable package is associated with an authorized application and account, the process continues with the execution of the requested deployment. As part of the deployment operation, content of the packages to be deployed may be parsed and analyzed. The deployable package may include static content representing software documentation. The software documentation may describe the application or module associated with or represented by the deployable package, but not necessarily. Software documentation content may be viewed as static when compared to binaries of the associated application, which binaries are representation of executable functional logic. In one embodiment, at 130, the deployable package is parsed to search for a file that includes software documentation content, where the package may be parsed according to a set of rules. The software documentation content may include a set of help documents in various formats such as HyperText Markup Language (HTML) files, Dynamic HTML (DHTML) files, Eclipse help files, etc.

Rules that may govern parsing of the deployable package may include searching for a file conforming to a predetermined type and a naming convention, and organized at a predetermined location within the deployable package. For example, the file that represents the software documentation content may be represented as an archive file such as zip or jar. In one embodiment, a documentation content archive may be any collective unit of documentation content. Further, the predetermined file may conform to a naming convention with a unique name and a version of the associated application. An exemplary format may be "<unique_name>-<version>.<zip/jar>", for example, "com.sap.docu.jpaas-1.0.103.zip". In one embodiment, the dash symbol "-" may be used as a separator between the name and the version. In addition, the file that includes the software documentation content may be organized under a predetermined location of the deployable package, e.g., may be located under "<application_root>/docusets/", where <application_root>represents the root directory of the deployable package.

At 140, it is determined that the file including software documentation is included in the deployable package. At 150, the file including software documentation is extracted from the deployable package. At 160, the extracted file including software documentation is stored in a repository. The repository may be a storage space of the cloud platform such as a central file system of the cloud platform. According to process 100, during deployment of an application or a module, not only the application or module are deployed onto the cloud platform, but also the software documentation may be dynamically delivered to the cloud platform. Thus, the documentation describing a particular application, feature, or module may be synchronized with the release cycle of that application, feature, or module.

Figure 2:
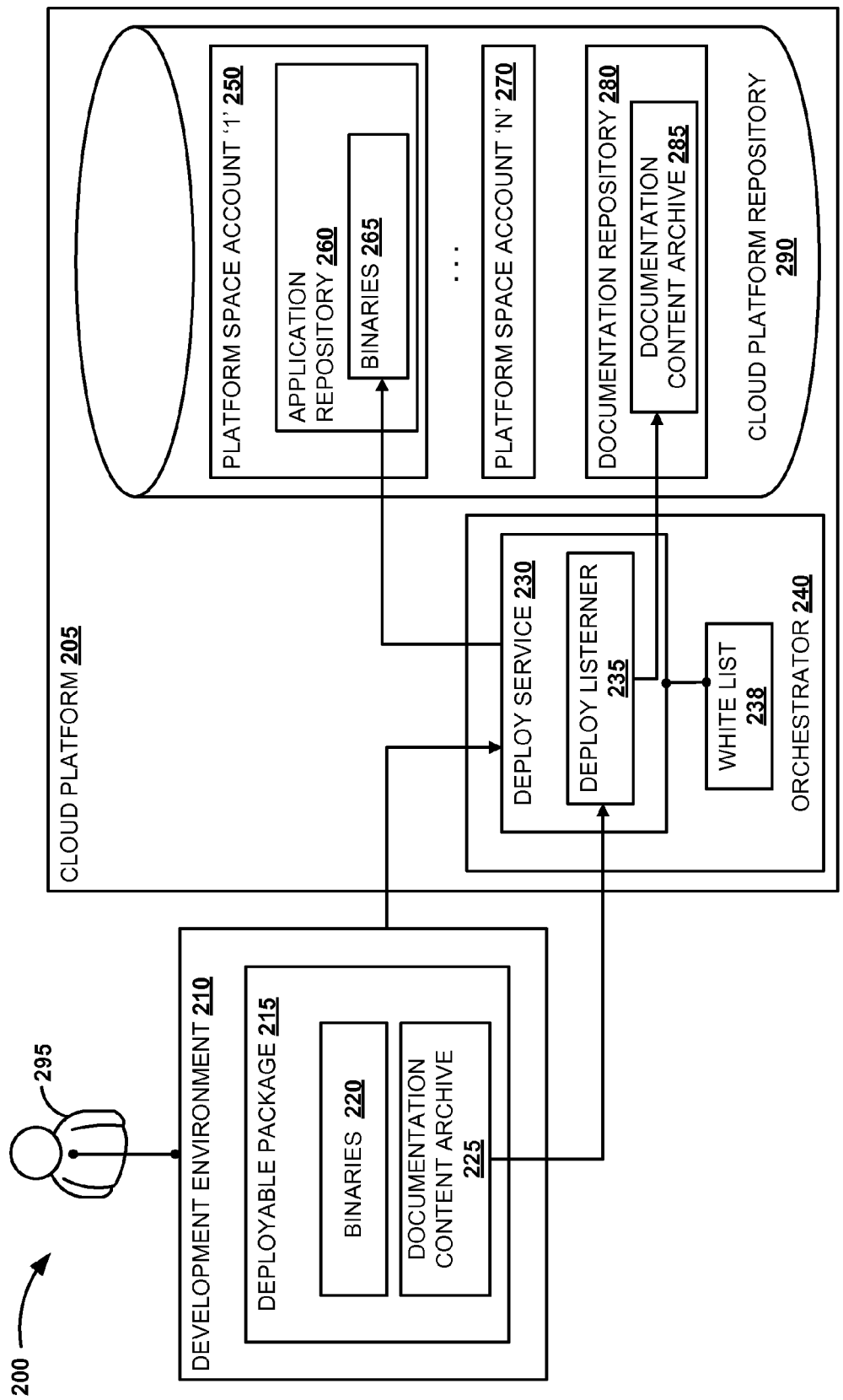
FIG. 2 illustrates an exemplary cloud computing environment to dynamically deliver static content to a cloud platform, according to some embodiments.

FIG. 2 illustrates an exemplary cloud computing environment 200 to dynamically deliver static content to cloud platform 205, according to some embodiments. In cloud computing environment 200, a number of consumers of cloud platform 205 (e.g., customer 295) may provide various services to their customers at cloud platform 205 over a network, e.g., the Internet. The different consumers of the cloud platform may deploy and/or request a variety of applications or services to be available for their respective customers. The customers of each of the consumers of cloud platform 205 may access the provided services using different client systems.

Customer 295 of cloud platform 205 may develop one or more applications or modules in development environment 210. For example, deployable package 215 representing an application may be generated in development environment 210. Development environment 210 may be a local integrated development environment (IDE) of the consumer. Alternatively, development environment 210 may be provided by cloud platform 205.

In various embodiments, once deployable package 215 is developed and generated, a deploy request is sent by customer 295 to a deploy service 230 of orchestrator 240. In one embodiment, orchestrator 240 manages the lifecycle of developed and deployed software applications on the cloud platform 205. Orchestrator 240 may be an administration server that, among other functions, deploys, starts, and stops the applications. Orchestrator 240 may install applications on one or more virtual machines (VMs), where the applications are accessed by end users. Orchestrator 240 may automatically provision more than one VM to host one application, according to some embodiments. Orchestrator 240 may parse, scan or otherwise process deployable package 215. Upon parsing deployable package 215, deploy service 230 of orchestrator 240 deploys binaries 220 and metadata contained in deployable package 215 to cloud platform repository 290. Deploy service 230 deploys binaries 220 and metadata contained in deployable package 215 according to an account of customer 290 and name of the application represented by deployable package 215.

For example, binaries 265 are binaries 220 transferred by deploy service 230 to application repository 260. Application repository 260 is a repository dedicated for the application represented by deployable package 215 at platform space account '1' 250 of cloud platform repository 290. Platform space account '1' 250 is a space at cloud platform repository 290 dedicated and specified for the account requesting deployment of deployable package 215, for example, a cloud account to which customer 290 belongs. Cloud platform repository 290 may include a number of spaces distributed among cloud accounts such as one or more platform space account 'N' 270.

In one embodiment, prior to parsing deployable package 215, it is checked whether deployable package 215 is associated with an authorized application. To determine whether deployable package 215 is authorized to be deployed, it is checked whether the account of customer 290 and the name of the application represented by deployable package 215 are listed or specified in white list 238. White list 238 is a file kept by orchestrator 240 that specifies accounts and names of applications that are authorized to deliver documentation content. While list 238 is an additional security measure to prevent unauthorized delivery of documentation content to the cloud platform. In one embodiment, regardless whether customer 295 requests deployment of deployable package 215 via a shell, a command line, an IDE, an UI wizard of the cloud platform 205, etc., customer 295 specifies the name of the application and the cloud account. A number of users associated with the cloud account are authorized to request deployment on cloud platform 205. If the account and the name of the application pertinent to deployable package 215 are included in white list 238, and if customer 295 provides necessary credentials for the cloud account, then deployment is authorized and execution of the deployment operation may continue.

In one embodiment, upon determining that deployable package 215 includes documentation content archive 225, deploy listener 235 of orchestrator 240 extracts and stores documentation content archive 225 in documentation repository 280. Documentation repository 280 stores documentation content archive of applications or modules deployed to cloud platform 205. Documentation repository 280 may further include documentation of functionality provided by cloud platform 205. In one embodiment, delivering documentation content archive 285 to documentation repository 280 is independent from the cloud account of customer 290 and the name of the application represented by deployable package 215. Documentation content archive 285 represents transferred or copied documentation content archive 225 from deployable package 215 to documentation repository 280. In one embodiment, documentation repository 280 may be an external to cloud platform repository 290.

Figure 3:
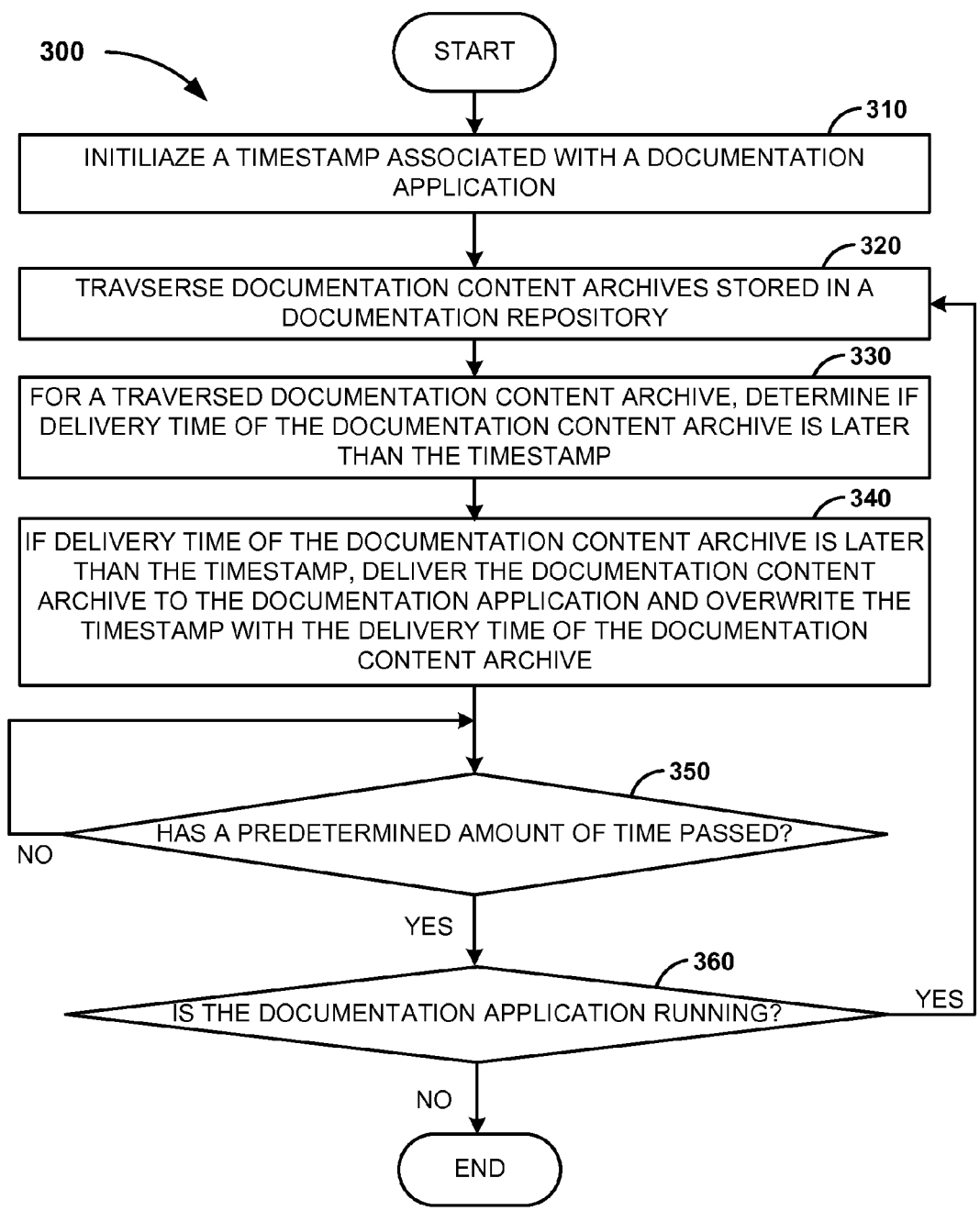
FIG. 3 illustrates a process to dynamically update documentation content of a documentation application, according to some embodiments.

FIG. 3 illustrates process 300 to dynamically update documentation content of a documentation application, according to some embodiments. When the documentation application is started, at 310, a timestamp that is associated with the documentation application is initialized. For example, initial value of the documentation application timestamp may be zero. In one embodiment, the documentation application may be restarted when the cloud platform is also restarted.

At 320, documentation content archives that are stored in a documentation repository (e.g., documentation repository 280) are traversed. For a traversed documentation archive, at 330, it is determined whether delivery time of the documentation content archive is later in time than the documentation application timestamp. A value of the delivery time of the documentation content archive is when the documentation content archive is deployed or delivered to the documentation repository. When the delivery time of the documentation content archive is later in time than the value of the documentation application timestamp, the documentation content archive has been delivered later than the last documentation content currently published by the documentation application. A delivery timestamp that is later in time than the documentation application timestamp indicates that a newer version of documentation content of the respective application is delivered for update in the documentation repository. In such case, at 340, the documentation content archive is delivered to and extracted into the documentation application to be published and displayed. Also, the value of the documentation application timestamp is overwritten with the delivery time of the documentation content archive. For example, it is overwritten with a value of a timestamp that represents a value of a property "last modified". A value of the property "last modified" may represent the delivery time of the documentation content archive to the documentation repository.

At 350, it is checked whether a predetermined amount of time has passed. In one embodiment, repeatedly, in a predetermined time interval, the documentation application checks the documentation repository to determine whether new documentation content for update has been delivered. It is checked to determine whether the documentation repository includes at least one archive including documentation content for update.

In one embodiment, the predetermined value of the time interval may be a configurable setting. Once the predetermined amount of time has passed, at 360, it is checked whether the documentation application is still running When the documentation application is still running, then the documentation application again traverses documentation content archives that are stored in the documentation repository to determine if there is a new documentation content for update. Determining whether there is new documentation for update by comparing timestamp values, overcomes the need to compare versions of respective applications or modules to determine the latest one. Versioning of applications may be error prone and may follow various versioning conventions.

Figure 4:
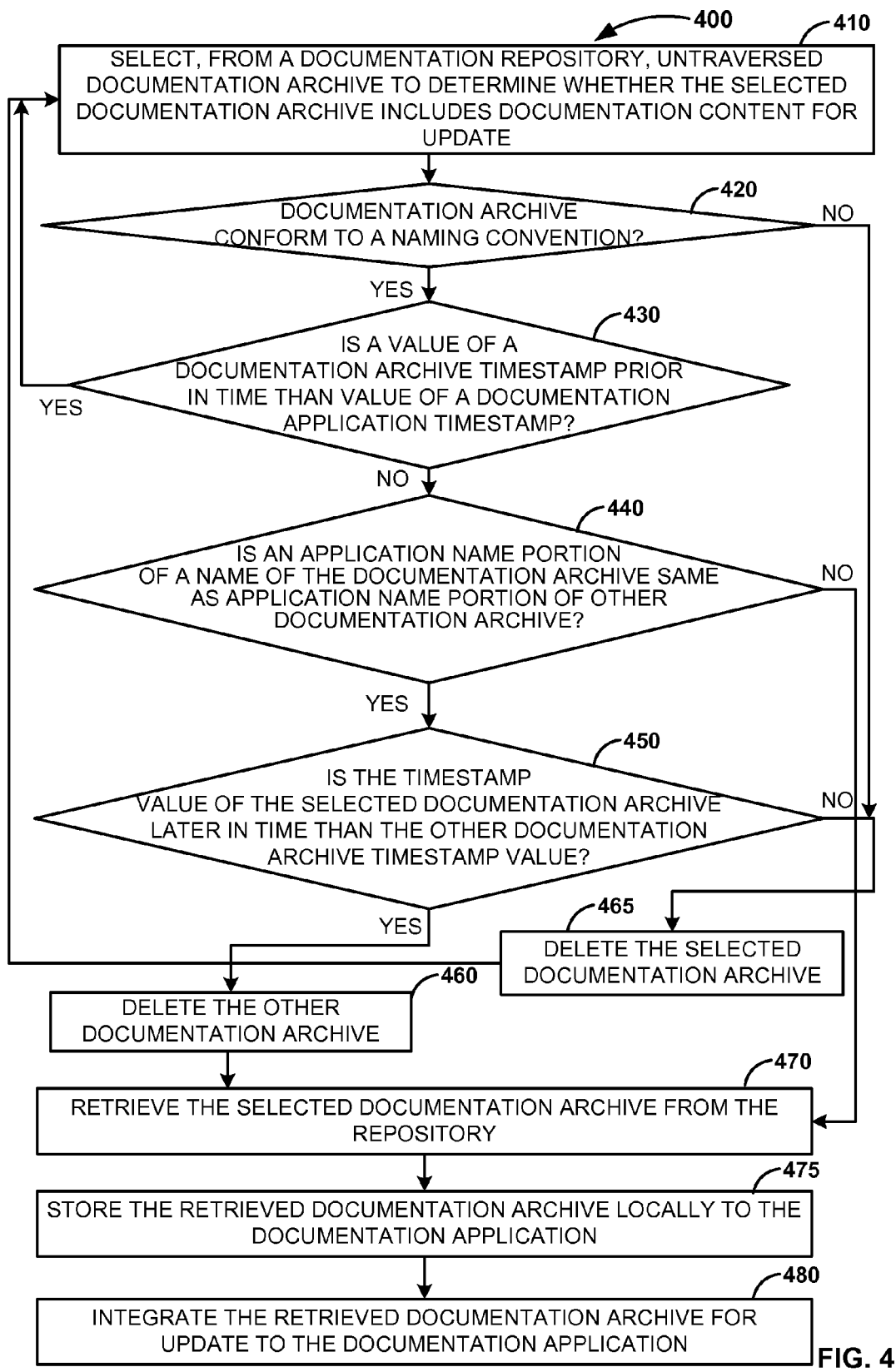
FIG. 4 illustrates a process to dynamically integrate documentation content for update from a documentation repository to a documentation application, according to some embodiments.

FIG. 4 illustrates process 400 to dynamically integrate documentation content for update from a documentation repository to a documentation application, according to some embodiments. At 410, a documentation archive, which has not been traversed yet, is selected from a documentation repository to determine whether the selected documentation archive includes documentation content for update. At 420, it is checked whether the selected documentation archive conforms to a naming convention. The naming convention is predetermined for documentation content archives to be deployed on a cloud platform during deployment of a deployable package. For example, format of a documentation content archive name may be "<application_name>-<version>", where "<application_name>" should not include a dash symbol and "<version>" should include numbers and dots. The portion of the name of the documentation content archive after the dash symbol represents the version of the respective application or module. If the selected documentation archive does not conform to the naming convention, at 465, the documentation archive is deleted from the documentation repository. Otherwise, non-conforming documentation may be integrated to the documentation application and kept into the documentation repository. Therefore, the naming convention may permit, at least in-part, to clean the documentation repository and the documentation application from non-conforming or obsolete documentation content.

When the selected documentation archive conforms to the naming convention, at 430, it is checked whether a value of a documentation archive timestamp is prior in time than a value of a documentation application timestamp. When the value of the documentation archive timestamp is prior in time than the value of the documentation application timestamp, then the documentation archive has already been synchronized with the respective documentation content integrated into and displayed by the documentation application. In such case, the selected documentation content is up-to-date and process 400 may continue with selecting the next unselected documentation archive.

When the value of the documentation archive timestamp is later in time than the value of the documentation application timestamp, then the selected documentation archive residing in the repository is a later version than the one published into the documentation application for the respective application. In such case, the selected documentation archive may need to be updated in the documentation application. Prior to updating the selected documentation archive, it may be checked, at 440, whether a portion of the name of the selected documentation archive that represents the name of the application is the same as the application name portion of other documentation archive stored in the repository.

When there is no other documentation archive in the repository that has the same application name portion as the selected documentation archive and when the value of the selected documentation archive timestamp is later in time than the value of the other documentation archive timestamp, the process continues at 470. At 470, the selected documentation archive is retrieved from the repository to be published or integrated into the documentation application. In one embodiment, at 475, the retrieved documentation archive may be stored locally to the documentation application, to be processed for update and integration. At 480, the retrieved documentation archive for update is integrated into the documentation application.

If there is another documentation archive in the repository that has the same application name portion as the selected documentation archive, then at least two versions of documentation content related to the same application name are stored in the documentation repository. To determine which version is a later version, timestamps may be compared. At 450, it is checked whether the value of the selected documentation archive timestamp is later in time than the value of the other documentation archive timestamp. When the value of the selected documentation archive timestamp is later in time than the value of the other documentation archive timestamp, the other documentation archive is an older version. Thus, at 460, the other documentation archive is deleted from the documentation repository. When the value of the selected documentation archive timestamp is prior in time than the value of the other documentation archive timestamp, then the selected documentation archive is an older version. Thus, at 465, the selected documentation archive is deleted from the documentation repository. Process 400 may continue with selecting the next unselected documentation archive.

When the value of the selected documentation archive timestamp is later in time than the value of the other documentation archive timestamp and once the other documentation archive is deleted, at 470, the selected documentation archive is retrieved from the repository to be published or integrated into the documentation application. In one embodiment, at 475, the retrieved documentation archive may be stored locally to the documentation application, to be processed for update and integration. At 480, the retrieved documentation archive for update is integrated into the documentation application.

Figure 5:
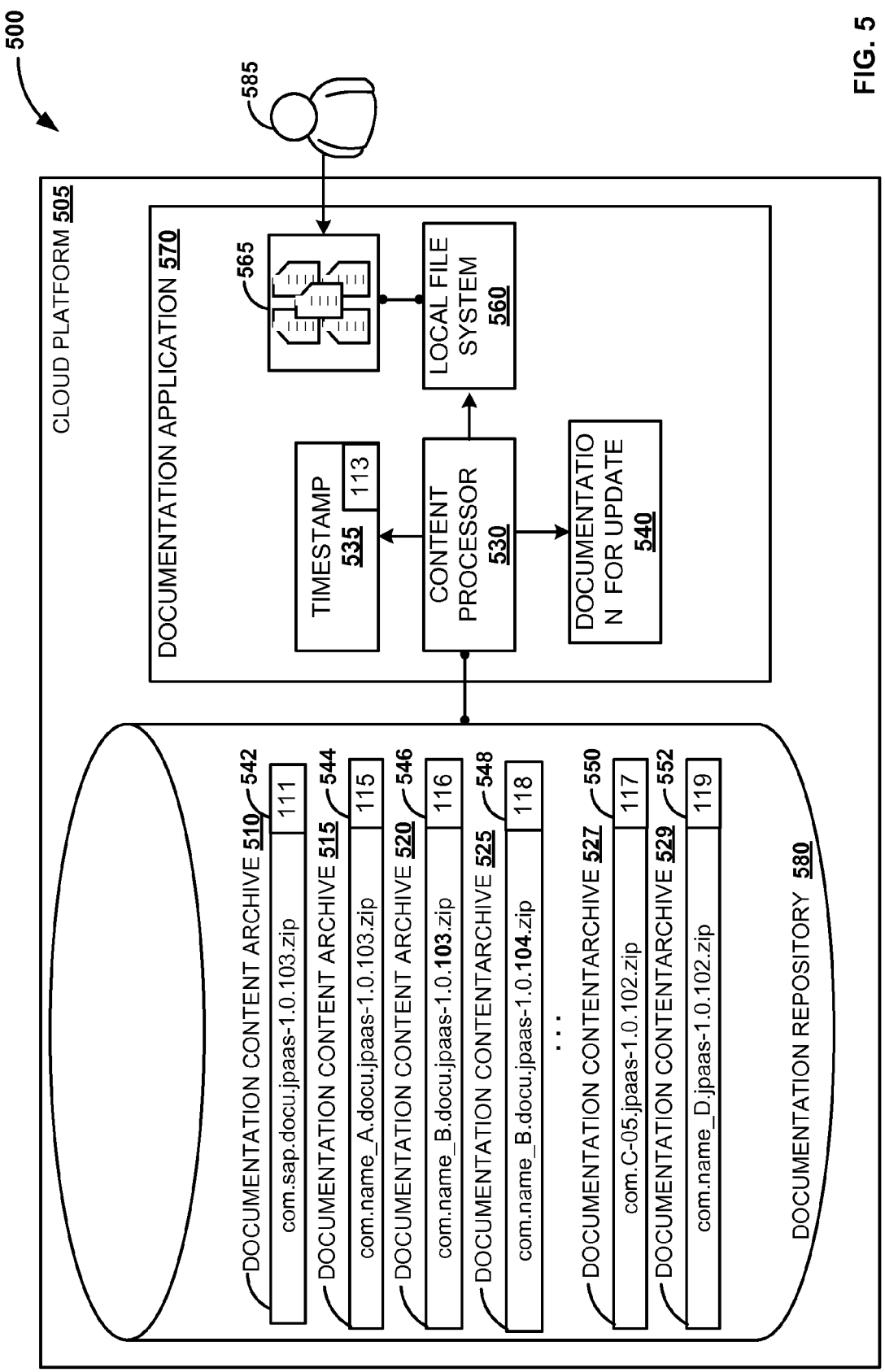
FIG. 5 illustrates an exemplary computer system to dynamically update documentation content of a documentation application, according to some embodiments.

FIG. 5 illustrates an exemplary computer system 500 to dynamically update documentation content of documentation application 570, according to some embodiments. Periodically, content processor 530 of documentation application 550 checks for new documentation content and retrieves such from documentation repository 580 of cloud platform 505, according to one embodiment. For example, in a predetermined time interval, content processor 530 traverses documentation archives stored in documentation repository 580 (e.g., documentation content archives 510-529) and compares values of respective timestamps 542-552 with timestamp 535 of the documentation application. In one embodiment, content processor 530 retrieves one or more documentation content archives that include documentation content for update from documentation content archives 510-529. The one or more documentation content archives that include documentation content for update may be stored locally into, or referenced by, a list local to documentation application 570, e.g., in a list of documentation for update 540.

To illustrate with an example, currently timestamp 535 value may be '113'. The values of timestamps given herein are exemplary. In some embodiments, a value of a timestamp is encoded value for example of date and time of a day and may be accurate to a small fraction of a second. Content processor 530, periodically traverses documentation content archives 510-529 stored in documentation repository 580. Content processor 530 selects documentation content archive 510. According to process 400, content processor 530 checks whether the name of documentation content archive 510, i.e., "com.sap.docujpaas-1.0.103.zip" conforms to the predetermined naming convention. In this exemplary case, the name of documentation content archive 510 may conform.

Content processor 530 compares the value of timestamp 542 with the value of timestamp 535. Since, the value of timestamp 535 is higher (e.g., later in time) than the value of timestamp 542, then documentation content archive 510 is synced with documentation content 565 integrated into and displayed by documentation application 570 to one or more users such as user 585. In such case, content processor 530 continues with selecting documentation content archive 515 and compares the value of timestamp 544 with the value of timestamp 535. Since, the value of timestamp 535 is lower (e.g., prior in time) than the value of timestamp 544, e.g., '113<115', then documentation content archive 510 is a later version than the one included in documentation content 565. For example, the documentation content archive 510 includes documentation content for update.

In one embodiment, prior to processing documentation content archive 515 to be pushed for update and integrated into documentation application 570, content processor 530 checks whether the name portion of the name of the documentation archive 510 is the same as another documentation archive from documentation archives 510-529. For example, it is checked whether a portion of the name of documentation archive 515 prior to the dash symbol, i.e., "com.name_A.docu.jpaas" is the same as another one in documentation repository 580. Since there is no other documentation archive, content processor 530 retrieves and keeps reference to documentation content archive 515 locally by, for example, the list documentation for update 540. Also, content process 530 overwrites the value of timestamp 535 with the value of timestamp 544 of documentation content archive 515. The value of timestamp 535 becomes '115'.

Content processor 530 continues with selecting documentation content archive 520. In this exemplary case, documentation content archive 520 conforms to the predetermined naming convention. Content processor 530 compares the value of timestamp 546 with the value of timestamp 535. Since, the value of timestamp 535 is lower (e.g., prior in time) than the value of timestamp 546, e.g., '115<116', then documentation content archive 520 is a later version than the one included in documentation content 565. Prior to delivering documentation content archive 520 to documentation for update 540, it is checked whether a portion of the name of documentation content archive 520 prior to the dash symbol, i.e., "com.name_B.docu.jpaas" is same as another one in documentation repository 580. The name portion of documentation content archive 520 is the same as the name portion of the name of documentation content archive 525.

According to process 400, it is checked which documentation content archive 520 or 525 is a later version of the respective application 'name_B' by comparing values of timestamp 546 and timestamp 548. Since, value '118' of timestamp 548 is higher (e.g., later in time) than value '116' of timestamp 546, according to process 400, documentation content archive 520 is an older version and is deleted from documentation repository 580. In this way, comparing timestamps may permit customers to revert documentation content versions in sync with reverting respective application or feature versions.

Content processor 530 continues with selecting documentation content archive 525. Content processor 530 checks whether the name of documentation content archive 525, i.e., "com.name_B.docujpaas-1.0.104.zip" conforms to a predetermined naming convention. In this exemplary case, content archive 525 may conform to the naming convention. Content processor 530 compares the value of timestamp 586 with the value of timestamp 535. Since, the value of timestamp 535 is lower (e.g., prior in time) than the value of timestamp 546, e.g., '118<115', then documentation content archive 525 is a later version than the one included in documentation content 565. Hence, upon verifying that no other documentation archive has common name portion, content processor 530 retrieves and stores documentation content archive 525 locally into the list documentation for update 540. Also, content process 530 overwrites the value of timestamp 535 with the value of timestamp 548 of documentation content archive 525. The value of timestamp 535 becomes '118'.

Content processor 530 continues with selecting documentation content archive 527. Content processor 530 checks whether the name of documentation content archive 527, i.e., "com.C-05.jpaas-1.0.102.zip" conforms to a predetermined naming convention. In this case the name of documentation content archive 527 includes two dash symbols, for example, and does not conform to the naming convention. In such case, content process 530 deletes documentation content archive 527 from the documentation repository.

Content processor 530 continues with selecting documentation content archive 529. Documentation content archive 529 conforms to the naming convention, and is a later version than the one includes in documentation content 565. Hence, content processor 530 retrieves and stores documentation content archive 529 locally into the list documentation for update 540. Also, content process 530 overwrites the value of timestamp 535 with the value of timestamp 552 of documentation content archive 529. The value of timestamp 535 becomes '119'.

In one embodiment, a documentation archive for update stored in or referenced by the list documentation for update 540 is parsed. For each parsed documentation archive, meta information included in the documentation archive is read. Meta information may specify a structure of documentation content. For example, the meta information may define a tree structure of HTML pages and sub-ages of the documentation content for update. In some embodiments, meta information may be information specified in files including, but limited to, "treedata.html", "frameset.html", properties file, etc. Based on the read meta information for each documentation archive, among other things, it is determined location into local file system 560 of documentation application 570, where to extract and publish documentation content for update.

In one embodiment, a file may be stored into the local file system 560 of documentation application 570 that may represent a cumulative information regarding documentation content 565 of applications or modules integrated into and displayed by the documentation application 570. Examples of such information regarding documentation content 565 may include, but is not limited to, the name of the respective application or module; upload or delivery time of the documentation content archive into the documentation repository, e.g., a delivery timestamp value; update or integration time when the content of the documentation archive is extracted to and published by the documentation application; and version information. In various embodiments, the file may be an HTML page that is accessible by the cloud provider and respective customers separately and independently from the documentation application. Based on the file, customers may check which documentation content version is displayed by the documentation application.

Figure 6A:
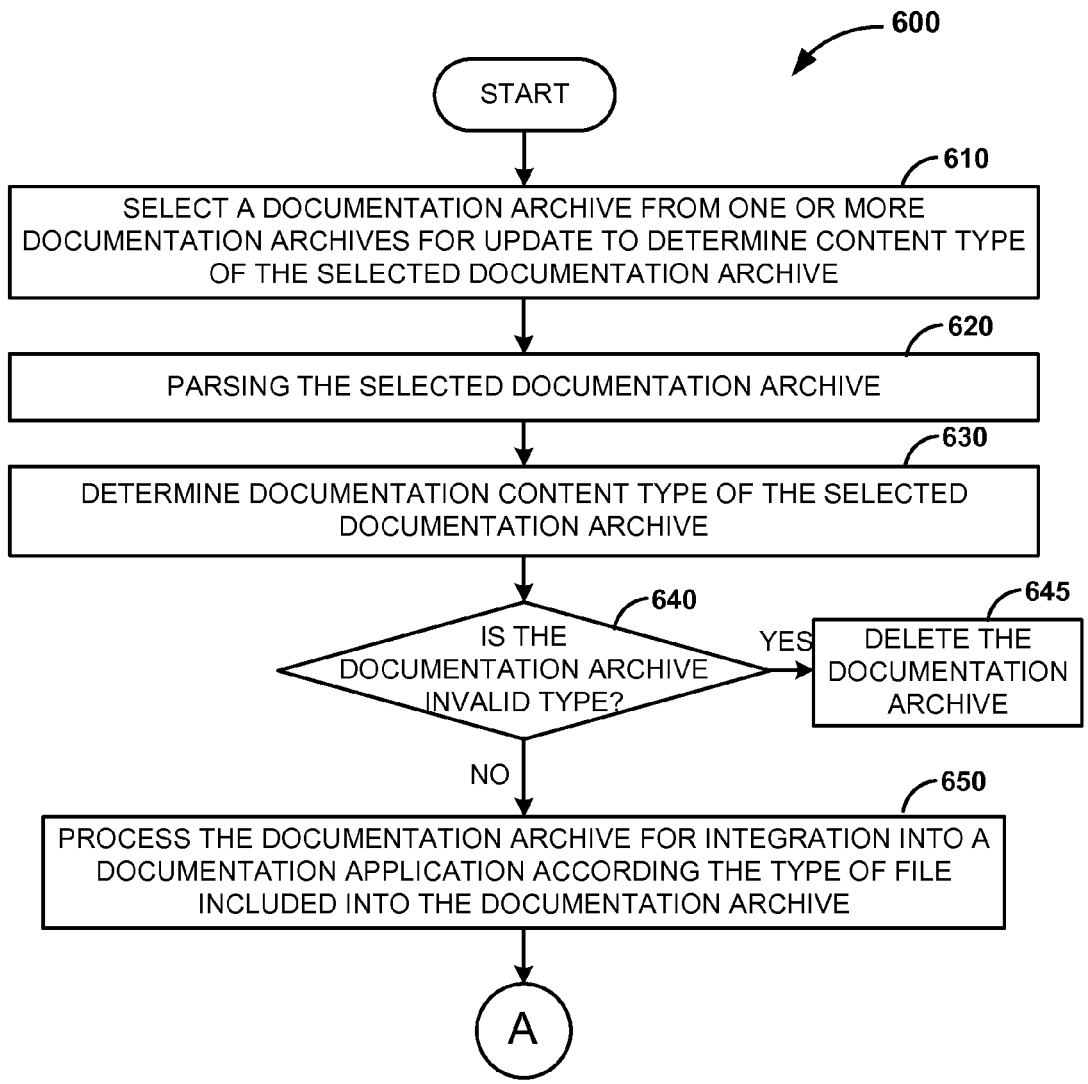
FIGS. 6A and 6B illustrate a process to integrate content of a documentation content archive to a documentation application, at runtime of the documentation application, according to some embodiments.
Figure 6B:
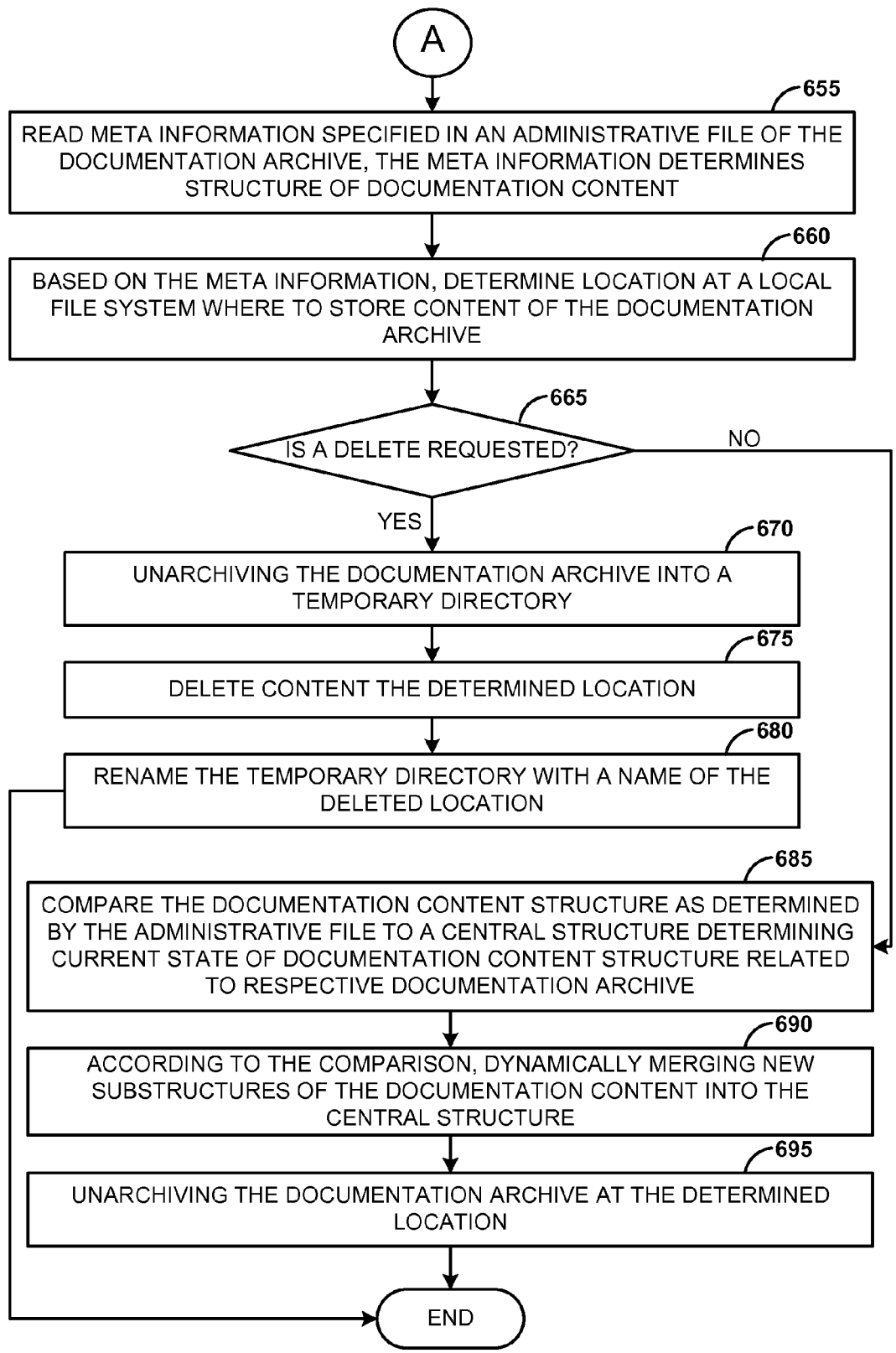

FIGS. 6A and 6B illustrate process 600 to integrate content of a documentation content archive to a documentation application, at runtime of the documentation application, according to some embodiments. At 610, a documentation archive is selected from one or more archives for update to determine content type of the selected documentation archive. The one or more archives including documentation content for update are determined by comparing timestamps of the one or more documentation archives with a documentation application timestamp. The documentation application timestamp has a value representing the time of the last documentation content update of the documentation application. Once determined, the one or more archives for update are retrieved locally to the documentation application or referenced by the documentation application.

At 620, the selected documentation archive is parsed. In one embodiment, the documentation archive is parsed to search for a file of one or more administrative files to determine the documentation content type. Examples of documentation content type may include, but are not limited to, a DHTML format exported from Content Management Solution (CMS) provided by IxiaSoft, Eclipse Help format, CONTENT format type that may include documentation content with a flat structure (e.g., javadoc, pdf, etc). The documentation archive is searched for an administrative file such as "treedata.html" to determine if the documentation content is of type DHTML. Further, the documentation content archive is search for an administrative file such as "frameset.html", to determine if the documentation content is of type Eclipse Help.

The administrative files determine the structure and organization of the documentation content to be displayed. In one embodiment, when the content type is not one of a DHTML format or an Eclipse Help format, it is checked whether the documentation archive includes a properties file in folder "META-INF/docuset.properties" to determine if the content type is "CONTENT". The administrative files and content types are exemplary and other administrative files specifying meta information and other content types may be possible, according to various embodiments.

At 630, documentation content type of the selected file is determined At 640, it checked whether the documentation archive is of invalid type. In one embodiment, when the content type is not one of a DHTML format or an Eclipse Help format, and when a properties file is not found in the documentation archive, the documentation archive is determined to be of invalid type and, at 645, the documentation archive is deleted from the documentation repository. When the documentation content type is one of the predetermined one or more valid types, at 650, the documentation archive is processed for integration into the documentation application, according to the determined documentation content type. For example, according to the meta information specified in the respective administrative file.

At 655, meta information specified in an administrative file included in the documentation archive is read. The meta information determines the structure of the documentation content. According to the structure, the documentation content is to be displayed by the documentation application. In one embodiment, the meta information of the administrative file may specify values of one or more properties. Examples of properties specified in an administrative file may include, but are not limited to, a "foldername" property, a "label" property, a "description" property, and a "delete" property. The "foldername" property specifies where to extract the content of the documentation archive, relative to the application root at the file system local to the documentation application. For example, if "foldername=help", the content of the documentation archive will be extracted in folder "help". The "label" property specifies the label of a main link of the documentation content for update in a main page of the documentation application displaying documentation content of various consumers of the cloud platform. The "description" property specifies the description text of the documentation content for update at the main page of the documentation application. The "delete" property specifies if the old content should be cleared prior to the delivery of the new content. The value is 'true' if deletion of the old content is desired At 660, based on the meta information, location where to store the content of the documentation archive may be determined. The location at a local file system of the documentation application. For example, according to the value of the "foldername" property, the directory at the local file system related to the application associated with the documentation content archive is determined.

In one embodiment, at 665, it is checked whether a delete is requested. For example, when the value of the "delete" property is true, then a delete operation is requested. When a delete operation is requested, at 670, the documentation archive is unarchived into a temporary directory of the local file system of the documentation application. At 675, delete determined location. At 680, the temporary directory is renamed with the name of the already deleted location. Thus, new documentation is delivered and updated during runtime of the documentation application and the time of content unavailability may be minimized Otherwise, downtime of the documentation application causes unavailability of the documentation content during the downtime.

When a delete operation is not requested, then the documentation archive may include documentation content that is an incremental update of the previously published documentation content related to the same application or module. In such case, the documentation content structure, as determined by the administrative file of the delivered documentation archive, is compared to a central content structure at 685. The central content structure determines current state of the documentation content structure related to the respective application or module of the documentation archive. In one embodiment, structures of documentation content may be a tree structure represented by, for example, a "tree.xml" file.

According to the comparison, at 690, one or more new substructures of the delivered documentation content are dynamically merged into the current central structure. For example, for a tag in the structure of the delivered documentation content, it is checked whether a tag with the same name or heading exists in the current central structure. Any new content organized under the tag is also merged into the current central structure under the same tag. In one embodiment, the current central structure is dynamically updated by merging any new substructure from the delivered documentation content into the current central structure.

At 695, the documentation archive is unarchived at the determined location. In one embodiment, if merging fails, the current state of the central structure is kept and the delivered documentation archive is not unarchived at the local file system of the documentation application.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
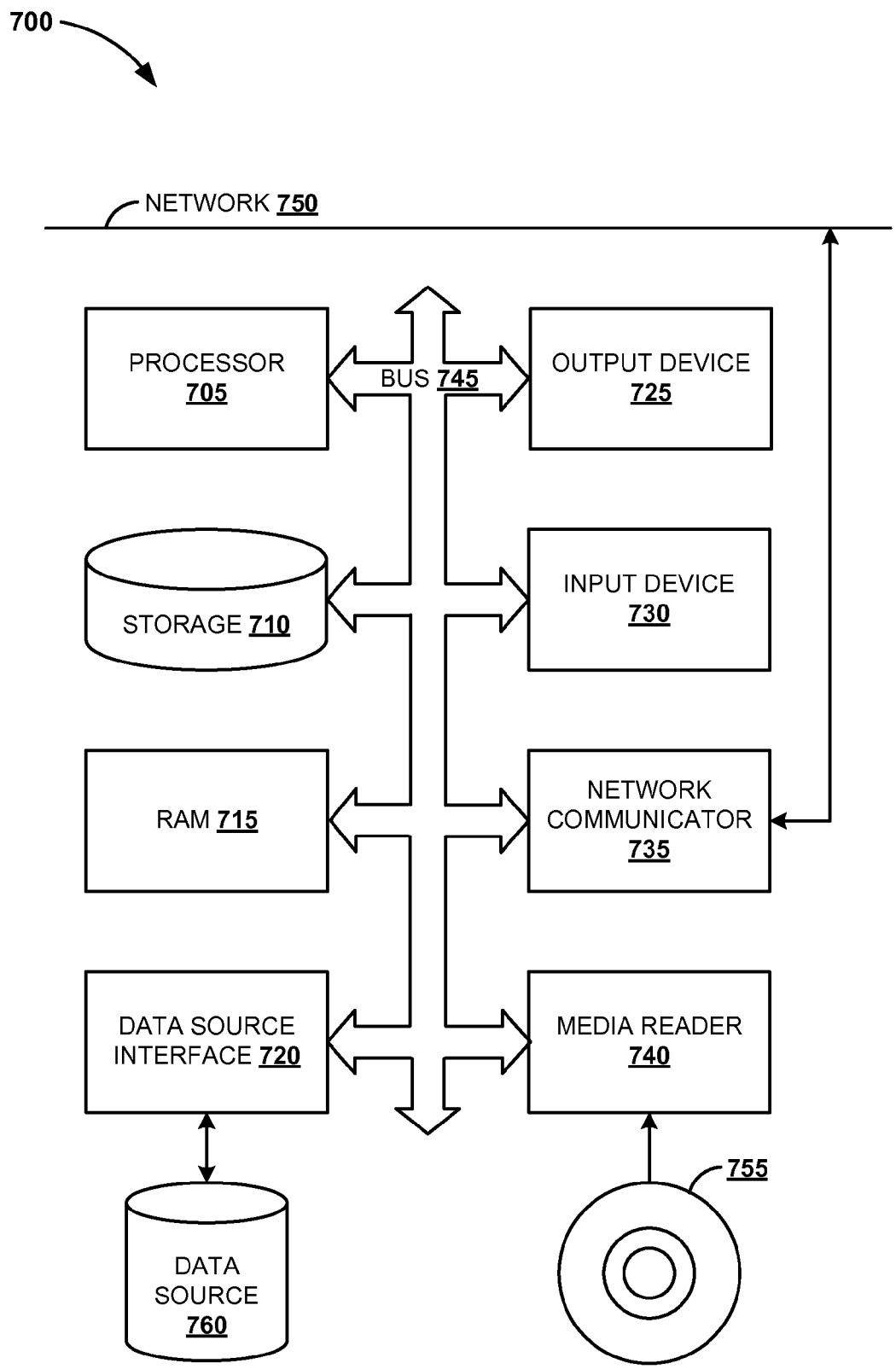
FIG. 7 illustrates an exemplary computer system, according to some embodiments.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, all of the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to dynamically update help content on a cloud computing platform, the method comprising:
   a processor periodically checking a documentation repository by a documentation application to determine whether the documentation repository includes at least one archive including documentation content for update;
   upon determining that the documentation repository includes the at least one archive including the documentation content for update, retrieving from the documentation repository the at least one archive including the documentation content for update;
   parsing the at least one archive including the documentation content for update to read meta information specified in the at least one archive;
   based on the meta information, the processor integrating a portion of the documentation content for update into the documentation application at runtime of the documentation application;
   determining whether a portion of a name of the at least one archive representing an application name is same as an application name portion of other archive including documentation content stored in the documentation repository;
   upon determining that the portion of the name of the at least one archive is same as the other archive stored in the documentation repository, comparing a timestamp value of the at least one archive with the timestamp value of the other archive to determine an older version from one of the at least one archive and the other archive; and
   based on the comparison, deleting from the documentation repository the older version from one of the at least one archive and the other archive.

2. The method of claim 1, wherein integrating the portion of the documentation content for update into the documentation application further comprises:
   unarchiving the at least one archive in a predetermined location of a file system of the documentation application, wherein the predetermined location is specified in the meta information.

3. The method of claim 1, further comprising:
   reading the meta information specified in an administrative file of the at least one archive including the documentation content for update, the meta information determining a structure of the documentation content for update;
   comparing the structure of the documentation content for update with a central structure of the documentation application, the central structure representing a current state of a documentation content related to the documentation content for update published by the documentation application;

based on the comparison, identifying the portion of the documentation content for update; and dynamically merging the portion of the documentation content for update into the central structure.

4. The method of claim 1, further comprising:

reading the meta information specified in an administrative file of the at least one archive including documentation content for update to determine whether a delete operation is requested and to determine a predetermined location of a file system of the documentation application that stores documentation content associated with the at least one archive;

upon determining that the delete operation is requested, copying the documentation content for update to a temporary location;

deleting the predetermined location of the file system of the documentation application; and renaming the temporary location with a name of the deleted predetermined location of the file system of the documentation application.

5. The method of claim 1, wherein determining whether the documentation repository includes the at least one archive including documentation content for update further comprises:

comparing a value of a timestamp of the at least one archive including the documentation content for update and a value of a central timestamp that represents a time of a last documentation content update of the documentation application, and upon determining that the value of the timestamp of the at least one archive is later in time than the value of the central timestamp, determining that the at least one archive includes the documentation content for update.

6. The method of claim 1, wherein determining whether the documentation repository includes the at least one archive including documentation content for update further comprises:

comparing a value of a timestamp of the at least one archive including the documentation content for update and a value of a central timestamp that represents a time of a last documentation content update of the documentation application.

7. The method of claim 1, wherein retrieving from the documentation repository the at least one archive including the documentation content for update further comprises:

upon determining that the at least one archive in the documentation repository includes the documentation content for update, retrieving the at least one archive for update locally to the documentation application.

8. The method of claim 1, further comprising:

receiving a deployment request to deploy a deployable package on the cloud computing platform;

according to a set of rules, parsing the received deployable package to search for a file including documentation content, the set of rules includes rules for specifying a predetermined type of the file, a predetermined location at the deployable package specifying where to search for the file, and a predetermined naming convention;

upon determining that the file including the documentation content is included in the deployable package, extract the file including the documentation content from the deployable package; and store the extracted file including the documentation content in the documentation repository.

9. The method of claim 8, further comprising:

upon receiving the deployment request, determining whether the deployment request is associated with an authorized account for authorized software associated with the deployment package;

upon determining that the deployment request is associated with the authorized account for the authorized software, verifying credentials provided with the deployment request; and authorizing the deployment upon the verified credentials.

10. The method of claim 1, further comprising:

when the at least one archive including the documentation content for update does not conform to a naming convention, the at least one archive is deleted from the documentation repository.

11. A computer system to dynamically update help content on a cloud computing platform, the system comprising:

a memory to store computer executable instructions;

at least one computer processor coupled to the memory to execute the instructions, the instructions comprising:

periodically checking a documentation repository by a documentation application to determine whether the documentation repository includes at least one archive including documentation content for update;

upon determining that the documentation repository includes the at least one archive including the documentation content for update, retrieving from the documentation repository the at least one archive including the documentation content for update;

parsing the at least one archive including the documentation content for update to read meta information specified in the at least one archive;

based on the meta information, integrating a portion of the documentation content for update into the documentation application at runtime of the documentation application;

determining whether a portion of a name of the at least one archive representing an application name is same as an application name portion of other archive including documentation content stored in the documentation repository;

upon determining that the portion of the name of the at least one archive is same as the other archive stored in the documentation repository, comparing a timestamp value of the at least one archive with the timestamp value of the other archive to determine an older version from one of the at least one archive and the other archive; and based on the comparison, deleting from the documentation repository the older version from one of the at least one archive and the other archive.

12. The computer system of claim 11, wherein integrating the portion of the documentation content for update into the documentation application further comprises:

unarchiving the at least one archive in a predetermined location of a file system of the documentation application, wherein the predetermined location is specified in the meta information.

13. The computer system of claim 11, wherein the instructions further comprise:

reading the meta information specified in an administrative file of the at least one archive including the documentation content for update, the meta information determining a structure of the documentation content for update;

comparing the structure of the documentation content for update with a central structure of the documentation application, the central structure representing a current state of a documentation content related to the documentation content for update published by the documentation application;

based on the comparison, identifying the portion of the documentation content for update; and dynamically merging the portion of the documentation content for update into the central structure.

14. The computer system of claim 11, wherein the instructions further comprise:

reading the meta information specified in an administrative file of the at least one archive including documentation content for update to determine whether a delete operation is requested and to determine a predetermined location of a file system of the documentation application that stores documentation content associated with the at least one archive;

upon determining that the delete operation is requested, copying the documentation content for update to a temporary location;

deleting the predetermined location of the file system of the documentation application; and renaming the temporary location with a name of the deleted predetermined location of the file system of the documentation application.

15. The computer system of claim 11, wherein determining whether the documentation repository includes the at least one archive including documentation content for update further comprises:

comparing a value of a timestamp of the at least one archive including the documentation content for update and a value of a central timestamp that represents a time of a last documentation content update of the documentation application, and upon determining that the value of the timestamp of the at least one archive is later in time than the value of the central timestamp, determining that the at least one archive includes the documentation content for update.

16. The computer system of claim 11, wherein determining whether the documentation repository includes the at least one archive including documentation content for update further comprises:

comparing a value of a timestamp of the at least one archive including the documentation content for update and a value of a central timestamp that represents a time of a last documentation content update of the documentation application.

17. The computer system of claim 11, wherein retrieving from the documentation repository the at least one archive including the documentation content for update further comprises:

upon determining that the at least one archive in the documentation repository includes the documentation content for update, retrieving the at least one archive for update locally to the documentation application.

18. The computer system of claim 11, wherein the instructions further comprise:

receiving a deployment request to deploy a deployable package on the cloud computing platform;

according to a set of rules, parsing the received deployable package to search for a file including documentation content, the set of rules includes rules for specifying a predetermined type of the file, a predetermined location at the deployable package specifying where to search for the file, and a predetermined naming convention;

upon determining that the file including the documentation content is included in the deployable package, extract the file including the documentation content from the deployable package; and store the extracted file including the documentation content in the documentation repository.

19. The computer system of claim 18, wherein the instructions further comprises:

upon receiving the deployment request, determining whether the deployment request is associated with an authorized account for authorized software associated with the deployment package;

upon determining that the deployment request is associated with the authorized account for the authorized software, verifying credentials provided with the deployment request; and authorizing the deployment upon the verified credentials.

20. The computer system of claim 11, further comprising:

when the at least one archive including the documentation content for update does not conform to a naming convention, the at least one archive is deleted from the documentation repository.

21. A non-transitory computer readable medium storing instructions thereon, which when executed by a processor cause a computer system to:

periodically check a documentation repository by a documentation application to determine whether the documentation repository includes at least one archive including documentation content for update;

upon determining that the documentation repository includes the at least one archive including the documentation content for update, retrieve from the documentation repository the at least one archive including the documentation content for update;

parse the at least one archive including the documentation content for update to read meta information specified in the at least one archive;

based on the meta information, integrate a portion of the documentation content for update into the documentation application at runtime of the documentation application;

determine whether a portion of a name of the at least one archive representing an application name is same as an application name portion of other archive including documentation content stored in the documentation repository;

upon determining that the portion of the name of the at least one archive is same as the other archive stored in the documentation repository, compare a timestamp value of the at least one archive with the timestamp value of the other archive to determine an older version from one of the at least one archive and the other archive; and based on the comparison, delete from the documentation repository the older version from one of the at least one archive and the other archive.

* * * * *